United States Patent
Houle et al.

(10) Patent No.: US 7,900,760 B2
(45) Date of Patent: **\*Mar. 8, 2011**

(54) MULTI-POSITION CLUTCH

(75) Inventors: Martin Houle, Laval (CA); Pierre Blouin, Boucherville (CA); Louis-Philippe Bibeau, Montreal (CA); Jianhong Xu, Longueuil (CA)

(73) Assignee: TM4 Inc., Boucherville (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/388,176

(22) Filed: Feb. 18, 2009

(65) Prior Publication Data

US 2009/0200129 A1    Aug. 13, 2009

Related U.S. Application Data

(63) Continuation of application No. 11/291,117, filed on Nov. 30, 2005, now Pat. No. 7,513,349.

(51) Int. Cl.
*F16D 27/12*    (2006.01)

(52) U.S. Cl. .................... 192/48.2; 192/48.9; 192/84.21; 192/84.96

(58) Field of Classification Search ................. 192/48.2, 192/84.95, 200, 84.21
See application file for complete search history.

(56) References Cited

U.S. PATENT DOCUMENTS

| | | | |
|---|---|---|---|
| 2,791,131 A | 5/1957 | Boughner | 475/203 |
| 3,390,749 A | 7/1968 | Etal | 192/84.941 |
| 4,335,429 A | 6/1982 | Kawakatsu | 701/102 |
| 4,588,040 A | 5/1986 | Albright, Jr. et al. | 180/165 |
| 5,492,189 A | 2/1996 | Kriegler et al. | 180/65.23 |
| 5,586,613 A | 12/1996 | Ehsani | 180/65.23 |
| 5,668,424 A | 9/1997 | Lamb | 310/103 |
| 5,691,588 A | 11/1997 | Lutz et al. | 310/92 |
| 5,773,904 A | 6/1998 | Schiebold et al. | 310/92 |
| 5,827,148 A | 10/1998 | Seto et al. | 477/15 |
| 5,838,085 A | 11/1998 | Roesel, Jr. et al. | 310/113 |
| 6,098,770 A | 8/2000 | Isley, Jr. | 192/35 |
| 6,107,761 A | 8/2000 | Seto et al. | 318/139 |
| 6,223,842 B1 | 5/2001 | Masaki | 180/65.23 |
| 6,455,947 B1 | 9/2002 | Lilley et al. | 290/40 C |
| 6,705,416 B1 | 3/2004 | Glonner et al. | 180/65.23 |
| 6,962,545 B2 | 11/2005 | Larkin | 475/5 |
| 7,513,349 B2 * | 4/2009 | Houle et al. | 192/48.2 |

(Continued)

FOREIGN PATENT DOCUMENTS

DE    209 519    12/1906

(Continued)

OTHER PUBLICATIONS

Office Action issued in Japanese Patent Application 2006-529502, mailed Oct. 28, 2008.

(Continued)

*Primary Examiner* — Edwin A Young
(74) *Attorney, Agent, or Firm* — Fulbright & Jaworski

(57) ABSTRACT

A multi-position clutch allows selectively coupling at least two of at least three rotatable shafts is described herein. The clutch comprises at least three cooperation elements respectively associated to one of the at least three rotatable shafts for selective engagement therebetween; the at least three cooperation elements are mounted to the at least three rotatable shafts so as to be sequentially positioned for selective coupling of at least two adjacent cooperation elements. An actuating mechanism is provided for selectively coupling at least two adjacent cooperation elements from the at least three cooperation elements.

32 Claims, 8 Drawing Sheets

U.S. PATENT DOCUMENTS

| | | |
|---|---|---|
| 2005/0275225 A1 | 12/2005 | Bertolotti ........................ 290/44 |
| 2007/0119678 A1 | 5/2007 | Houle et al. .................. 192/69.8 |

FOREIGN PATENT DOCUMENTS

| | | |
|---|---|---|
| JP | 06-144020 | 5/1994 |
| JP | 08-512450 | 12/1996 |
| JP | 10-014171 | 1/1998 |
| JP | 2002-059752 | 2/2002 |
| JP | 2002-087080 | 3/2002 |
| JP | 2002-542752 | 12/2002 |
| WO | WO 00/63041 | 10/2000 |
| WO | WO 2004/037594 | 5/2004 |
| WO | WO 2004/106096 | 12/2004 |

OTHER PUBLICATIONS

Office Action issued in U.S. Appl. No. 11/291,117, mailed Aug. 7, 2008.

Office Action issued in U.S. Appl. No. 11/291,117, mailed Nov. 26, 2007.

Office Action issued in U.S. Appl. No. 10/555,201, mailed Nov. 26, 2008.

\* cited by examiner

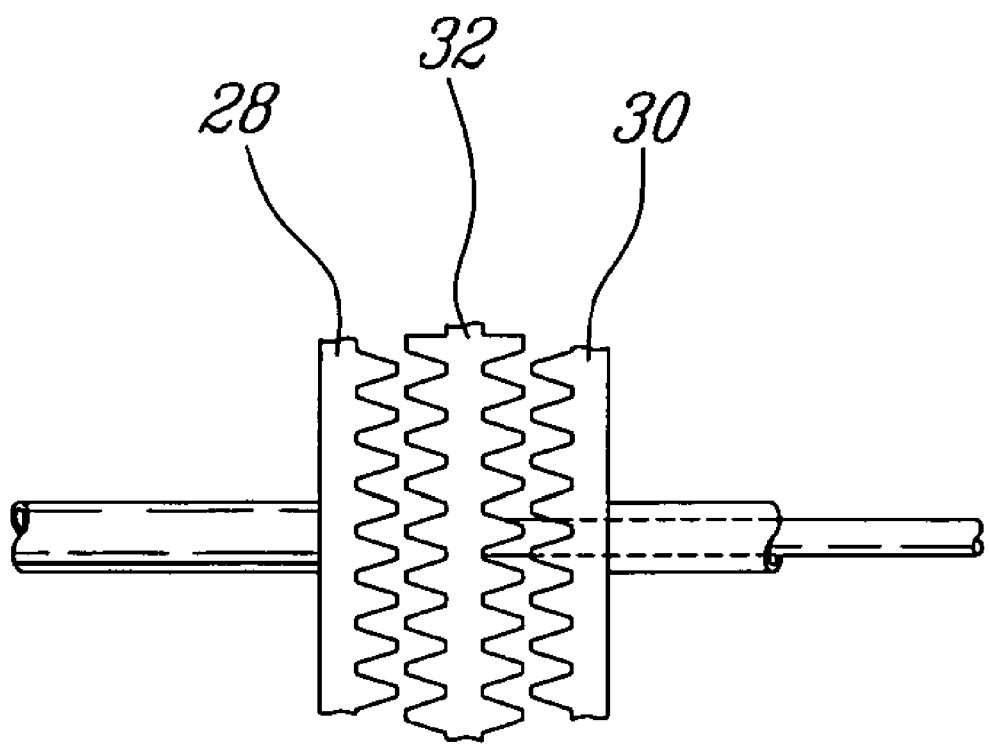

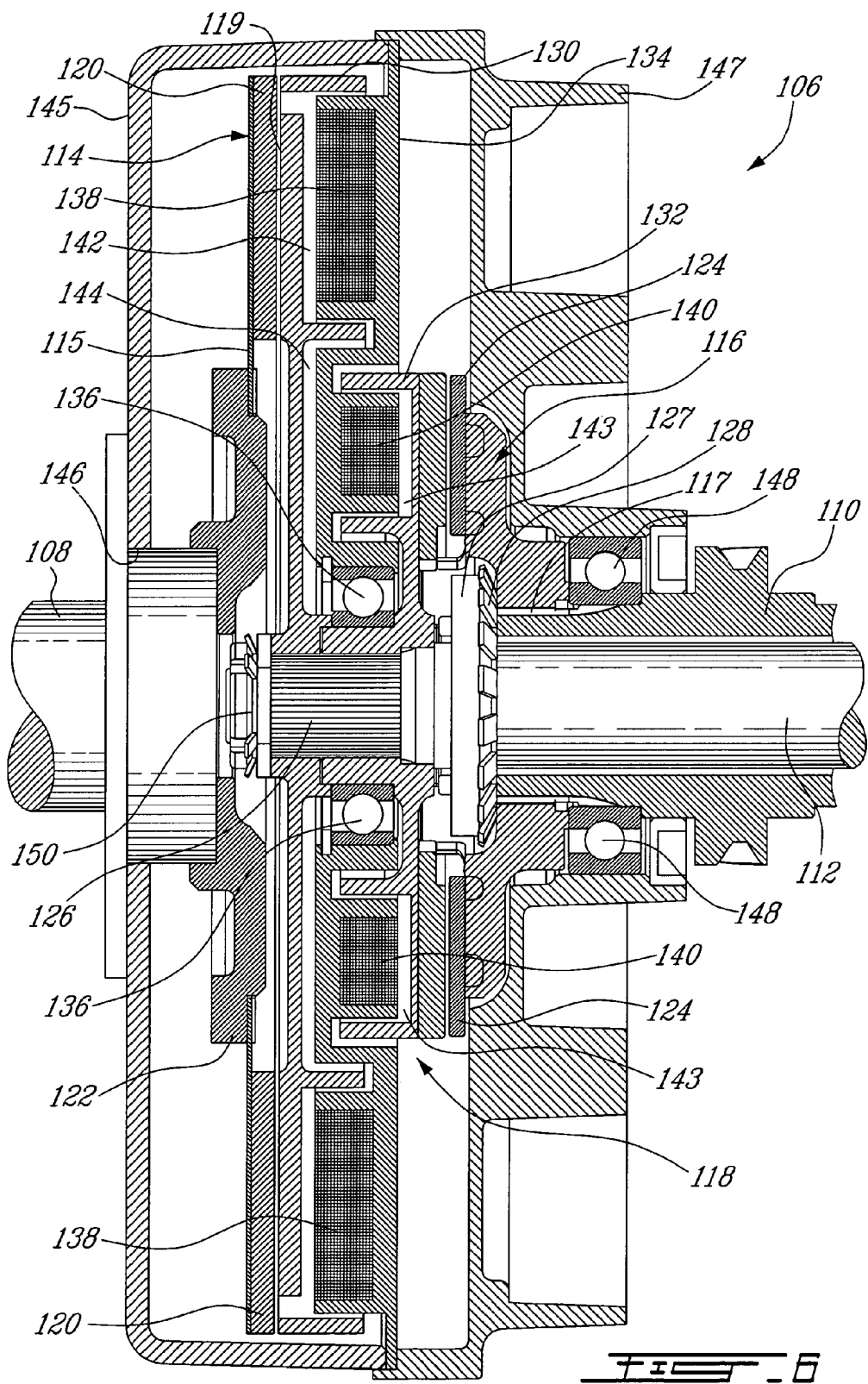

MULTI-POSITION CLUTCH

CROSS REFERENCE TO RELATED APPLICATION

This is a continuation of application Ser. No. 11/291,117, filed Nov. 30, 2005, now U.S. Pat. No. 7,513,349 the entire disclosure of which is specifically incorporated herein by reference.

FIELD OF THE INVENTION

The present invention relates to mechanical transmission. More specifically, the present invention relates to a multi-position clutch for selectively coupling at least two of at least three rotatable shafts.

BACKGROUND OF THE INVENTION

A conventional clutch, such as the one provided in most cars, includes a clutch disc or plate secured at the end of the transmission shaft for selective engagement with the flywheel, which is driven by the crankshaft. The clutch plate is selectively operated by an actuating mechanism which may include a pressure plate biased onto the clutch plate by springs and disengaged thereon by a thrust pad operating on the pressure plate via levers and a clutch cover. Of course, other clutch assemblies are known in the art. However, clutch assemblies from the prior art allow only the selective coupling of two predetermined shafts.

OBJECTS OF THE INVENTION

An object of the present invention is therefore to provide an improved clutch assembly.

Another object of the invention is to provide a multi-position clutch assembly allowing to selectively coupling at least two of at least three rotatable shafts.

SUMMARY OF THE INVENTION

More specifically, in accordance with the present invention, there is provided a multi-position clutch for selectively coupling at least two of at least three rotatable shafts, the clutch comprising:

at least three cooperation elements respectively associated to one of the at least three rotatable shafts for selective engagement therebetween; the at least three cooperation elements being mounted to the at least three rotatable shafts so as to be sequentially positioned for selective coupling of at least two adjacent cooperation elements; and an actuating mechanism associated to at least one of said at least three cooperation elements for selectively coupling the at least two adjacent cooperation elements from the at least three cooperation elements.

According to a second aspect of the present invention, there is provided a multi-position clutch for selectively coupling at least two of at least three rotatable shafts, the clutch comprising:

at least three disks each operatively associated to a respective one of the at least three rotatable shafts;

an actuating mechanism connected to one of the at least three rotatable shafts for selectively bringing into engagement at least two of the at least three disks.

Other objects, advantages and features of the present invention will become more apparent upon reading the following non restrictive description of preferred embodiments thereof, given by way of example only with reference to the accompanying drawings.

BRIEF DESCRIPTION OF THE DRAWINGS

In the appended drawings:

FIG. 1A illustrating the central gear of the clutch in a free-wheeling position; FIG. 1B illustrating the two right shafts of the clutch engaged; and FIG. 1C illustrating the left shaft of the clutch engaged with the shaft associated to the central gear;

FIG. 2 is a side elevation of a multi-position clutch for selectively coupling two of three rotatable shafts according to a second illustrative embodiment of the present invention;

FIG. 3A illustrating the central disk of the clutch in a free-wheeling position; FIG. 3B illustrating the two right shafts of the clutch engaged; and FIG. 3C illustrating the left shaft of the clutch engaged with the shaft associated to the central disk;

FIG. 4A illustrating the central disk of the clutch in a free-wheeling position; FIG. 4B illustrating the two right shafts of the clutch engaged; and FIG. 4C illustrating the left shaft of the clutch engaged with the shaft associated to the cooperation element of the clutch;

FIGS. 5A-5D illustrating four engagement positions of the clutch;

FIG. 6 is a cross-section of a multi-position clutch for selectively coupling two of three rotatable shafts according to a sixth illustrative embodiment of the present invention.

DETAILED DESCRIPTION

Figure 1A:
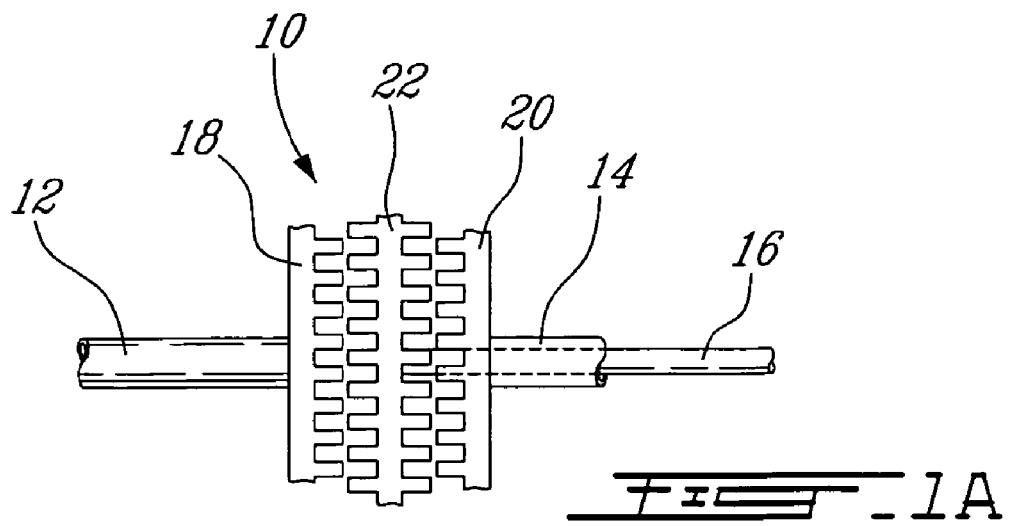
FIGS. 1A-1C are schematic side elevations of a multi-position clutch for selectively coupling two of three rotatable shafts according to a first illustrative embodiment of the present invention.

A multi-position clutch 10 for selectively coupling two of three rotatable shafts 12-16 according to a first illustrative embodiment of the present invention will now be described with reference to FIGS. 1A-1C.

The multi-position clutch 10 comprises first, second and third cooperation elements 18, 20 and 22 respectively associated to the first, second and third shafts 12, 14 and 16. The cooperation elements 18-22 are in the form of toothed gears secured at the end of each respective shaft 12-16. The first and second cooperation elements 18 and 20 includes rectangular teeth only on their facing side since they are meant to be selectively engaged only by the third cooperation element 22, which is positioned therebetween. Indeed, the three cooperation elements 18-22 are mounted to their respective rotatable shafts 12-16 so as to be sequentially positioned for selective coupling between adjacent cooperation elements. Therefore, the third toothed gear 22 includes cooperating rectangular teeth on both sides.

The first and second cooperation elements 18 and 20 are sufficiently distanced to allow the displacement of the third cooperation elements 22 therebetween as will now be described.

The third rotatable shaft 16 is inserted in the second shaft 14 for longitudinal reciprocal movement therein, the first and second shafts 12 and 14 being collinear. It is to be noted that the third shaft 16 is free to rotate inside the second shaft 14.

The multi-position clutch 10 further includes an actuating mechanism (not shown) operatively coupled to the third shaft 16 and/or to the cooperation element 22 for selectively coupling the cooperation element 22 with one of the other two cooperation elements 18 and 20.

The actuating mechanism may take any mechanical or electro-mechanical form for causing the translating movement of the third shaft 16 in the shaft 14. The actuating mechanism may for example operate via magnetism, a fork or a solenoid.

In FIG. 1A the central gear 22 is illustrated in a free-wheeling position where it does not engaged the first or the second gear 18 or 20.

Figure 1B:
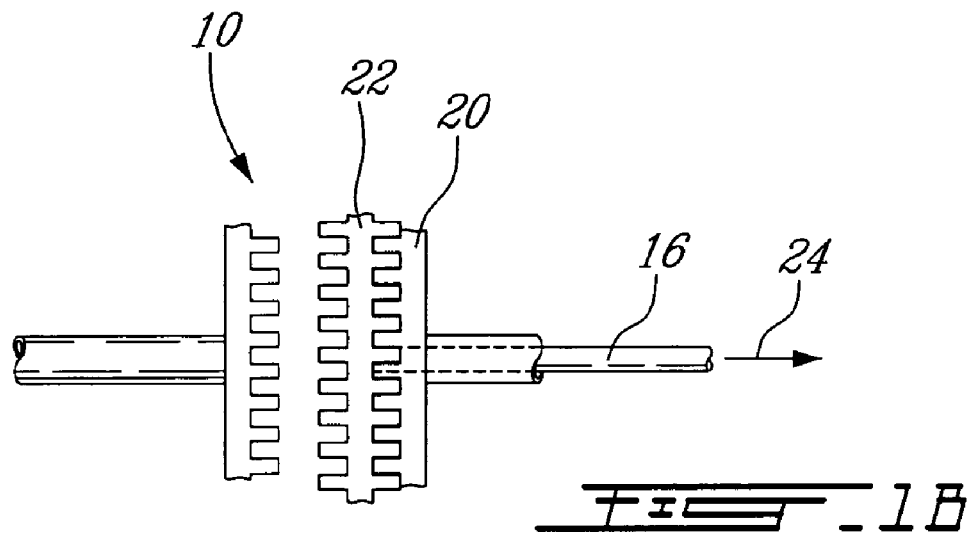

In FIG. 1B, the actuating mechanism has been triggered to pull the shaft 16 (see arrow 24) so as to bring into engagement the second and third cooperation elements 20 and 22; the clutch 10 is then in a first engagement position.

Figure 1C:
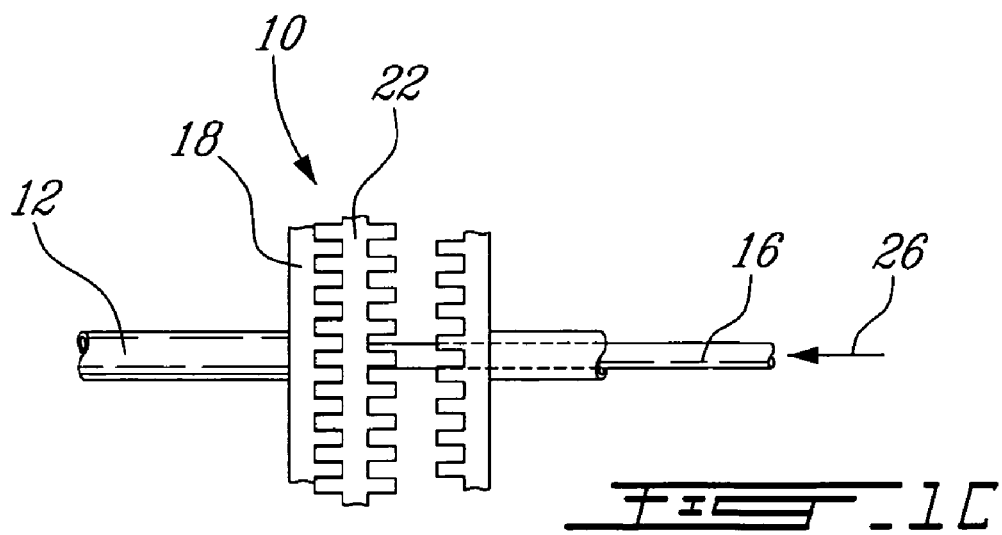

FIG. 1C illustrates the clutch in a second engagement position where the first and third cooperation elements 18 and 22 are brought into engagement following the pushing of the third shaft 16 towards the first shaft 12 (see arrow 26).

The multi-position clutch 10 may be actuated manually or may further include a controller coupled to the actuating mechanism for selectively controlling the operation thereof upon receiving user's commands.

The multi-position clutch 10 can be part, for example, of a hybrid drive of a vehicle, wherein the first, second and third shafts 12-16 would be operatively associated to an internal combustion engine (ICE) output shaft (not shown), the shaft of a traction motor (not shown), and the shaft of an electric generator (not shown).

Even tough the cooperation elements 18-22 are illustrated directly mounted to their respective shafts 12-16, they can also be indirectly operatively associated thereto.

Also, even though the gears 18-22 have been illustrated having rectangular teeth, the cooperation elements can be in the form of toothed gears with teeth having other configurations, as illustrated in FIG. 2 where gears 28-32 with tapered teeth are illustrated.

A multi-position clutch 34 according to a third illustrative embodiment of the present invention will now be described with reference to FIGS. 3A-3C. Since the clutch 34 is very similar to the clutch 10, and for concision purposes, only the differences between the two clutches will be described herein in more detail.

The first, second and third cooperation elements 36, 38 and 40 of the multi-position clutch 34, which are respectively associated to the first, second and third shaft 12, 14 and 16, are in the form of friction disks secured at the end of each respective shafts 12-16.

In operation, an actuating mechanism (not shown) is triggered to selectively bring into contact an adjacent pair of friction disks 36-40 or 40-38, causing the coupling of the respective pair of shafts 12-16 or 16-14 attached thereto.

Figure 3A:
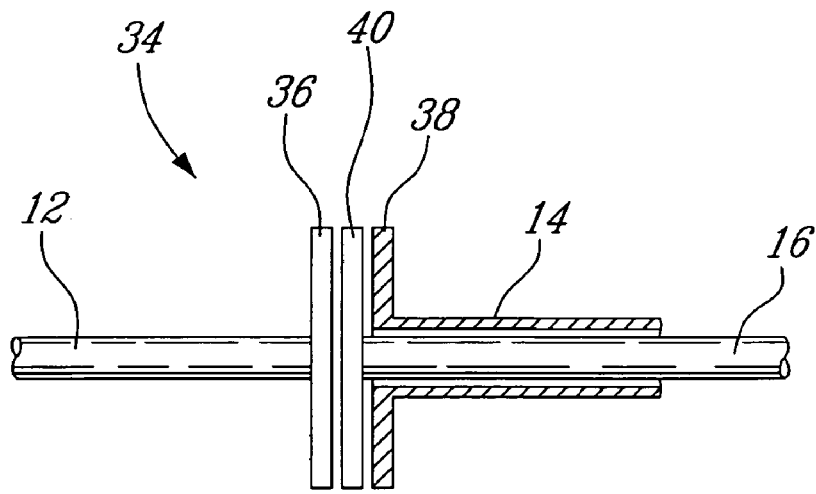
FIGS. 3A-3C are schematic cross-sections of a multi-position clutch for selectively coupling two of three rotatable shafts according to a third illustrative embodiment of the present invention.

In FIG. 3A, the central disk 40 is illustrated in a free-wheeling position where it does not engage the first or the second disk 36 or 38.

Figure 3B:
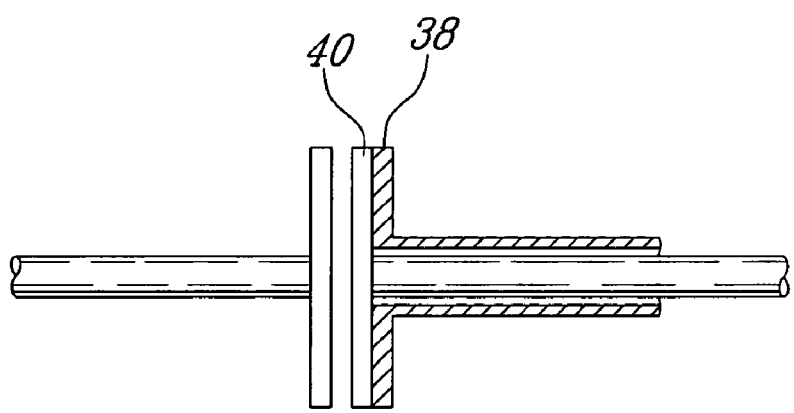

In FIG. 3B, the actuating mechanism has been triggered to bring into engagement the second and third cooperation elements 38 and 40; the clutch 34 is then in a first engagement position.

Figure 3C:
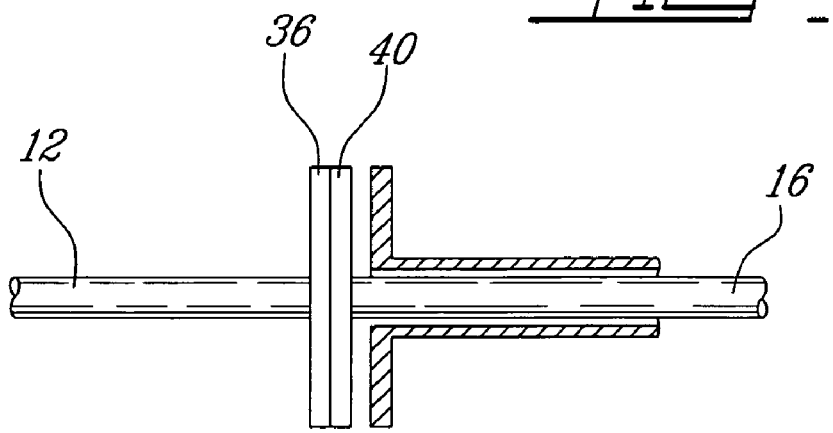

FIG. 3C illustrates the clutch in a second engagement position where the first and third cooperation elements 36 and 40 are brought into engagement following the pushing of the third shaft 16 towards the first shaft 12.

Since friction disks are believed to be well known in the art, they will not be described herein in more detail.

Figures 4A, 4B:
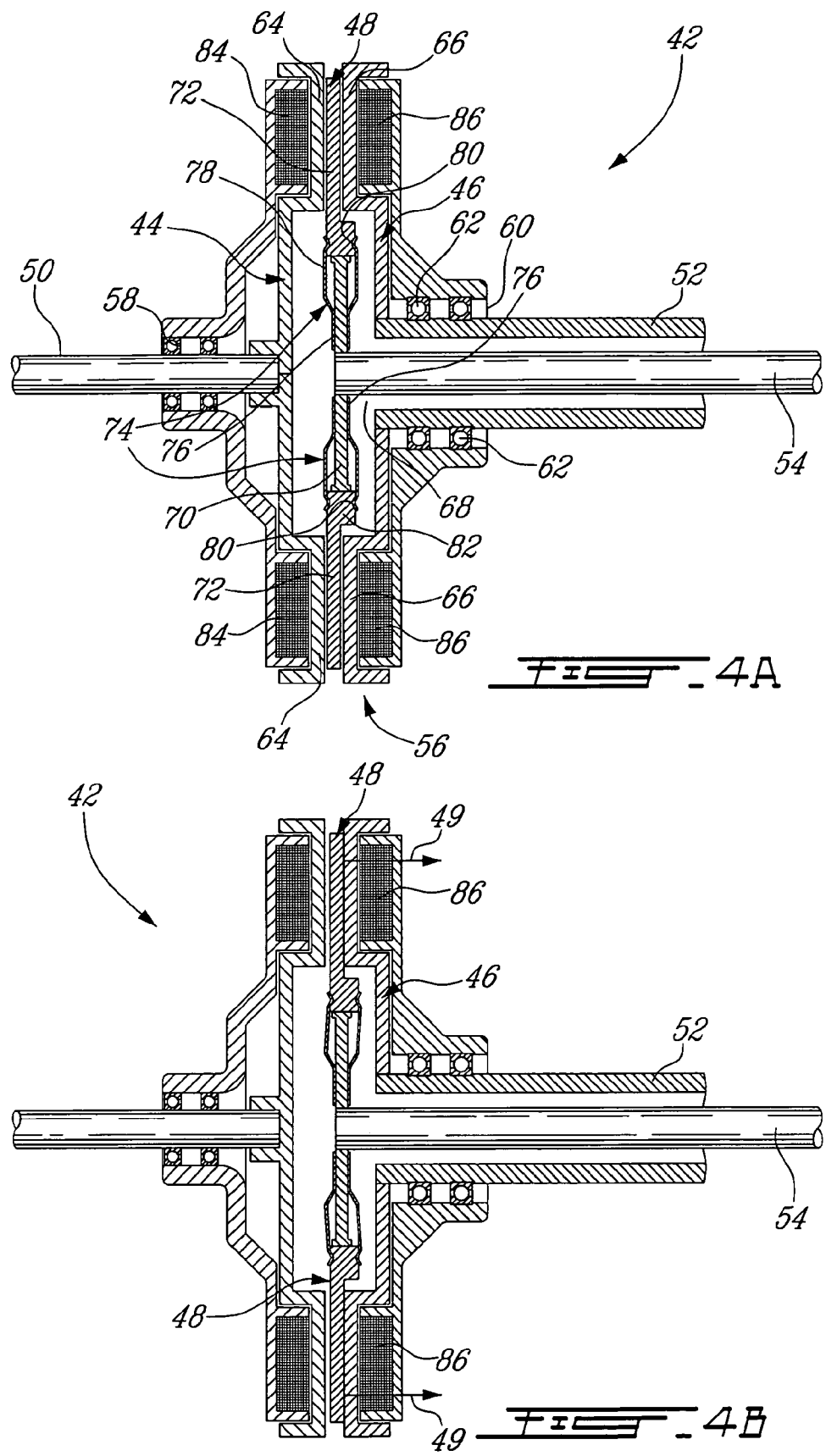
FIGS. 4A-4C are cross-sections of a multi-position clutch for selectively coupling two of three rotatable shafts according to a fourth illustrative embodiment of the present invention.
Figure 4C:
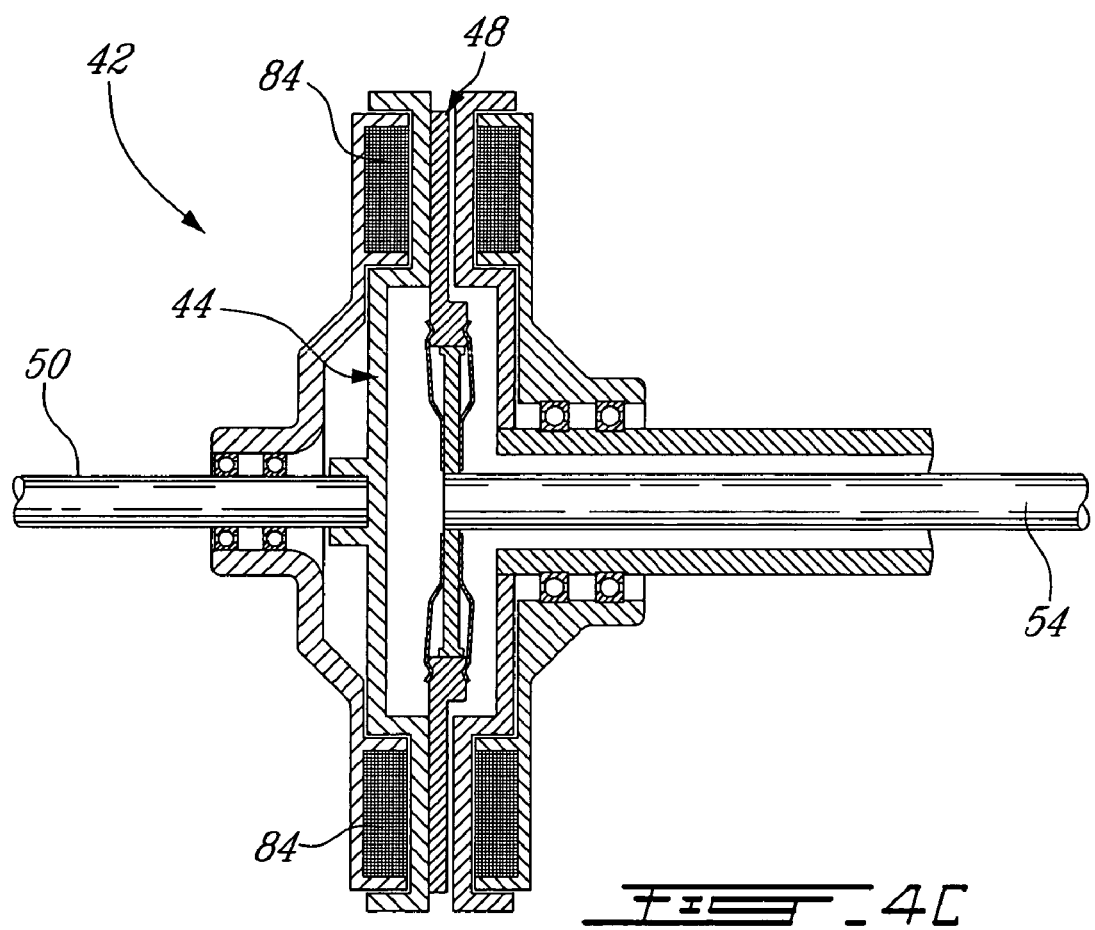

Turning now to FIGS. 4A-4C of the appended drawings, a multi-position clutch 42 according to a fourth embodiment of the present invention will be described. It is to be noted that for clarity purposes, the outer casing of the clutch 42 is not illustrated in the drawings.

The multi-position clutch 42 comprises first, second and third cooperation elements 44, 46 and 48 respectively secured to the first, second and third shaft 50, 52 and 54. The first, second and third cooperation elements 44-48 are enclosed in a two-part shell 56 having two opposite openings 58-60 allowing passage of the shafts 50 to 54 therethrough.

Similarly to the previously illustrated and described embodiments, the three shafts are coaxial and therefore one of the shafts, which in the present embodiment is the second shaft 52, is hollow in order to receive the third shaft 54 therein. The second shaft 52 is rotatably secured in the opening of the shell 56 by means of conventional ball bearings 62. Other type of friction members can alternatively be used between the second shaft 52 and the shell opening 60, including a lubricated friction joint (not shown).

It is to be noted that the first and third shafts 50 and 54 can also be rotatably secured via bearings, not shown in the schematic appended figures.

The first and second cooperation elements 44 and 46 are in the form of facing plates each provided with a peripheral flange 64 and 66 longitudinally spaced from the plate surface towards the third cooperation element 48 and acting as a friction element. Of course, the second plate 46 includes a central opening 68 to allow passage to the third shaft 54.

The third cooperation element 48 is in the form of a disk positioned between the first and second cooperation elements 44 and 46, generally parallel therewith. The third cooperation element 48 includes an inner disk 70, to which the third shaft 54 is coaxially mounted, and a peripheral ring 72 mounted thereto via two pairs of spring clamps 74, so that the peripheral ring 72 can selectively tilt towards one of the first and second cooperation elements 44 and 46. It is to be noted that the peripheral ring 72 is also mounted to the inner disk 70 via a splined connection therebetween. Accordingly, rotation of one of the inner disk 70 and peripheral ring 72 causes the rotation of the other of the inner disk 70 and peripheral ring 72.

Each clamp 74 includes a base portion 76 that is secured to the inner disk 70 near the third shaft 54. The jaw portion 78 of the clamp 74 is received in recesses 80 in an enlarged portion 82 of the peripheral ring 72. The enlarged portion 82 allows the tensioning of the clamp 74 so as to maintain the grip on the peripheral ring 72 while allowing tilting movement thereof.

The multi-position clutch 42 further includes an actuating mechanism, including first and second electromagnetic coils 84 and 86, for selectively coupling two adjacent cooperation elements from the three cooperation elements 44 to 48.

As illustrated in FIG. 4B, energizing the second electromagnetic coil 86 causes the third cooperation element 48 to be pulled (see arrow 49) onto the second cooperation element 46 thereby coupling the second and third shafts 52-54. When this is the case, the clutch 42 is in a first engagement position.

FIG. 4C illustrates the clutch 42 in a second engagement position where the first and third cooperation elements 44 and 48 are brought into engagement following the energizing of the first electromagnetic coil 84, thereby coupling the first and third shafts 50 and 54.

In FIG. 4A the central cooperation element 48 is illustrated in a free-wheeling position where it does not engage the first or the second cooperation element 44 or 46.

As will now become more apparent, the multi-position clutch 42 allows selectively coupling two of three rotatable shafts, whether the shafts can move longitudinally or not.

The third cooperation element 48 can be in the form of any deformable disk or element, having at least one portion movable form a freewheeling position to a first or second engagement position with one of the adjacent cooperation elements.

Of course, the actuating mechanism may further include an actuator (not shown) for selectively triggering the energizing of the first and second electromagnetic coils 84-86. The actuator may take many forms from a mechanical triggering mechanism including for example a conventional clutch pedal connected to a controller (both not shown).

A multi-position clutch 88 according to a fifth illustrative embodiment of the present invention will now be described with reference to FIGS. 5A-5D. While the clutches 10, 34 and 42 described hereinabove are three-position clutches, the clutch 88 is a four-position clutch as will be described hereinbelow in more detail.

The multi-position clutch 88 comprises first and second facing cooperation elements 98 and 100 respectively secured to the first and second aligned and coaxial shafts 90 and 92, the first and second cooperation elements 98 and 100 being in the form of friction disks.

The multi-position clutch 88 further includes a shaft assembly 93 mounted in the second shaft 92 for reciprocal and rotatable movements therein. The shaft assembly 93 has a double headed cooperation element 103 so secured thereto as to be positioned between the first and second cooperation elements 98 and 100 for selective or multi-engagement therewith as will be explained hereinbelow in more detail.

The shaft assembly 93 includes third and fourth shafts 94 and 96. The fourth shaft 96 receives the third shaft 94 for reciprocal longitudinal movement therein. However, the third shaft 94 is splined in the fourth shaft 96, therefore preventing rotational movement of the third shaft 94 with respect to the fourth shaft 96.

The second shaft 92 receives the fourth shaft 96 for reciprocal longitudinal movement therein. The fourth shaft 96 may rotate in the second shaft 92.

The double-headed cooperation element 103 includes third and fourth cooperation elements 102 and 104, in the form of independent friction disks, respectively secured to the third and fourth shafts 94 and 96.

It is to be noted that consecutive concentric shafts 94, 96 and 92 correspond to associated consecutive adjacent cooperation elements 104, 102 and 100.

The four-position clutch 88 further includes an actuating mechanism (not shown) similar to those described in relation to the multi-position clutches 10 and 34 for example. However, to allow reciprocal movement of the shaft assembly 93 in the second shaft 92, the actuating mechanism also allow selective reciprocal movement of the fourth shaft 94 in the third shaft 96.

The four positions of the clutch 88 will now be described.

Figure 5A:
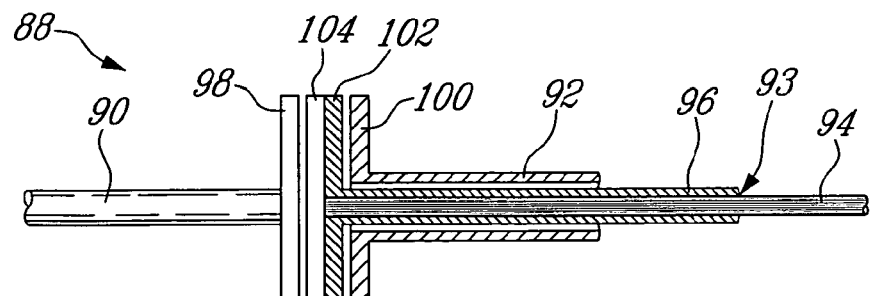
FIGS. 5A-5D are schematic cross-sections of a multi-position clutch for selectively coupling at least two of three rotatable shafts according to a fifth illustrative embodiment of the present invention.

FIG. 5A illustrates the four-position clutch 88 in a free-wheeling position, where none of the first and second cooperation elements 98 and 100 is engaged by the double-headed cooperation element 103.

Figure 5B:
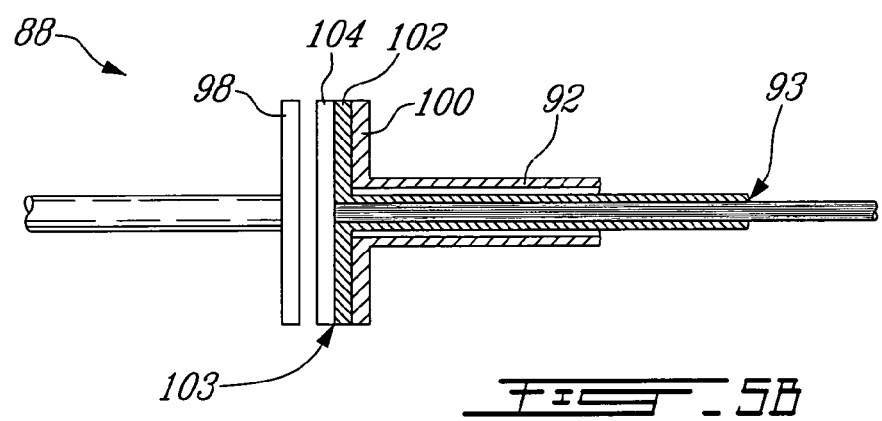

In FIG. 5B, the four-position clutch 88 is in a first engagement position where the double-headed cooperation element 103 engages the second cooperation element 100 via its third cooperation element 102. In this position, the shaft assembly 93 is coupled with the second shaft 92.

Figure 5C:
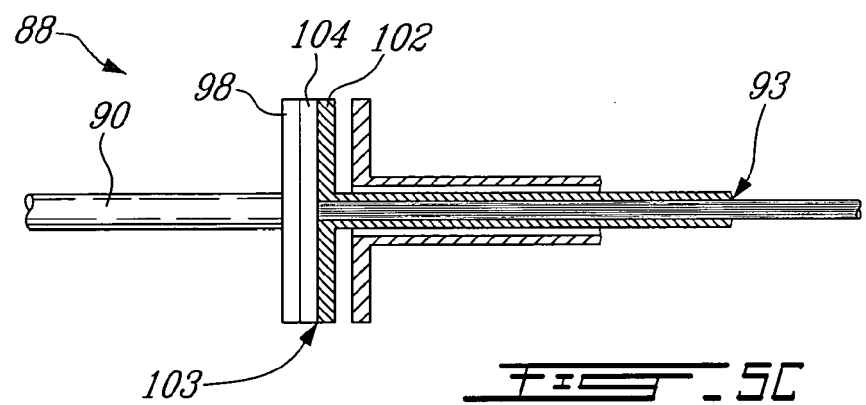

FIG. 5C illustrates the four-position clutch 88 in a second engagement position where the double-headed cooperation element 103 engages the first cooperation element 98 via its fourth cooperation element 104. In this position, the shaft assembly 93 is coupled with the first shaft 90.

Figure 5D:
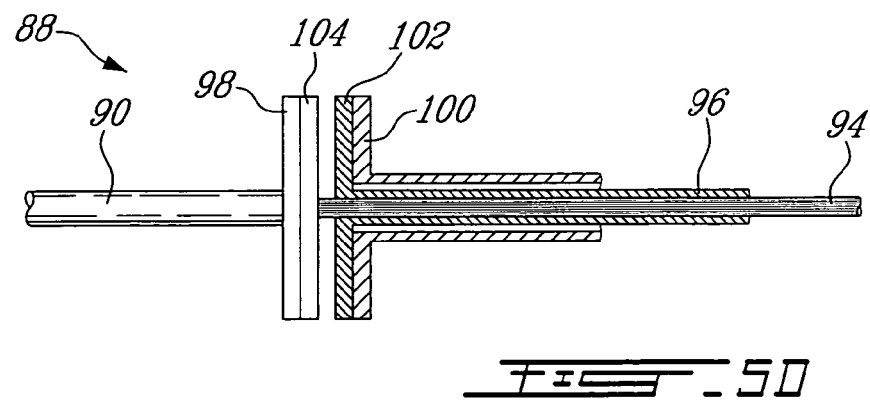

Finally, in FIG. 5D, the four-position clutch 88 is in a fourth engagement position where the fourth cooperation element 104 engages the first cooperation element 98 and the third cooperation element 102 engages the second cooperation element 100, resulting in the coupling of the first and second shafts 90 and 92 with the shaft assembly 93. This is allowed by the double-headed cooperation element 103 being split.

It is to be noted that even though the clutch 88 has been described hereinabove as a friction clutch, other clutch technologies could be used.

Turning now to FIG. 6 of the appended drawings, a multi-position clutch 106 for selectively coupling at least two of three rotatable shafts 108-112 according to a sixth illustrative embodiment of the present invention will be described.

The multi-position clutch 106 comprises first, second and third cooperation elements 114, 116 and 118 respectively associated to the first, second and third shaft 108, 110 and 112. Again, for illustrative purposes only, the example of a hybrid drive train will be used, even though the present invention is not limited to this specific example as stated hereinabove. Therefore, the first shaft 108 is coupled to the output shaft of an ICE (not shown), the second shaft 110 is coupled to at least one wheel (not shown) and the third shaft 112 is coupled to the output/input shaft of an electric motor/generator (not shown).

The first cooperation element 114 includes a first contact ring 120 secured to the output shaft of the ICE 108 via a mounting plate assembly 122.

The second cooperation element 116 is in the form of a disk snuggly fitted to a splined portion 117 of the second shaft 110 and is held thereto via a nut 127 and a lock washer 128 that threads onto a threaded end (not shown) of the shaft 110. The second cooperation element 116 is provided with a second peripheral contact ring 124 facing the third cooperation element 118. The second peripheral contact ring 124 is so mounted to the second cooperation element 116 as to be biased in its illustrated position of FIG. 6 by a biaising assembly (not shown) that may, for example, include expansion springs (not shown) provided between the elements 124 and 116.

The third cooperation element 118 includes a spline portion 126 provided at the longitudinal end of the third shaft 112, first and second contact disks 130-132 mounted about the spline portion 126 via their respective central splined apertures and an actuating element 134 mounted to the second contact disk 132 coaxially therefrom via ball bearings 136 between the first and second contact disks 130-132.

The actuating element 134 includes first and second electromagnetic coils 138-140; the first one being oriented towards the first cooperation element 114 radially adjacent to the first contact ring 120 and the second one being oriented towards the second cooperation element 116 radially adjacent to the second contact ring 124.

The first contact disk 130 includes first and second annular recesses 142-144 for receiving the portions of the actuating element 134 including respectively the first and second coils 138-140.

The second contact disk 132 includes a peripheral annular recess 143 for receiving the portion of the actuating element 134 including the second coil 140.

The third actuating element 118 is mounted between the first and second cooperation elements 114 and 116 so as to be longitudinally movable therebetween.

The first, second and third cooperation elements 114-118 are enclosed in an enclosure defined by first and second shell parts 145 and 147. The first shell part 145 includes an opening 146 to receive the shaft 108 that is connectable to the ICE. The third shaft 112, which is connectable to the output/input shaft of the electric motor/generator, is rotatably secured to the second shell part 147 via ball bearings 148. The second shaft 112 is coaxially and rotatably mounted in the third shaft 110.

The third cooperation element 118 is maintained onto the splined portion 126 of the shaft 112 by a fastener 150.

The multi-position clutch 106 further includes an actuating mechanism (not shown) which may include an actuator (not shown) for selectively energizing the first and second electromagnetic coils 138-140. The actuator may take many forms from a mechanical triggering mechanism including for example a conventional clutch pedal to a controller (both not shown).

As will now be described in more detail, the multi-position clutch 106 can be in four different positions allowing four different modes of operation.

The clutch 106 can be in a freewheeling mode as illustrated in FIG. 6, where none of the two electromagnetic coils 138-140 is energized. While in this position, the first, second and third cooperation elements 114, 116 and 118 remain unengaged.

Energizing the first electromagnetic coil 138 causes the first cooperation element 114 to move towards and engage the third cooperation element 118 under the electromagnetic force caused by the coil 138. Indeed, the first cooperation element 114 includes a thin and relatively flexible portion 115 that allow the longitudinal movement of the disk 120 towards a contact surface 119 of the third cooperation element 118.

While the clutch 106 is in this second position, the first and third shafts 108 and 112 are coupled, resulting in the coupling of the ICE with the output/input shaft of the electric motor/generator.

Energizing the second electromagnetic coil 140 causes the contact ring 124 of the second cooperation element 116 to move towards and engage the third cooperation element 118 under the electromagnetic force caused by the coil 140 that overcomes the biasing force maintaining the contact ring 124 in its illustrated position of FIG. 6. While the clutch 106 is in this third position, the second and third shaft 110 and 112 are coupled, resulting in the coupling of the electric motor/generator with the wheel(s).

Finally, energizing both the first and second electromagnetic coils 138-140 causes the engagement of the third cooperation element 118 with both the first and second cooperation element 114 and 116 under the electromagnetic forces. While the clutch 106 is in this fourth position, the first second and third shaft 108, 110 and 112 are coupled, resulting in the coupling of the ICE, electric motor/generator and the wheel(s).

Figure 7:
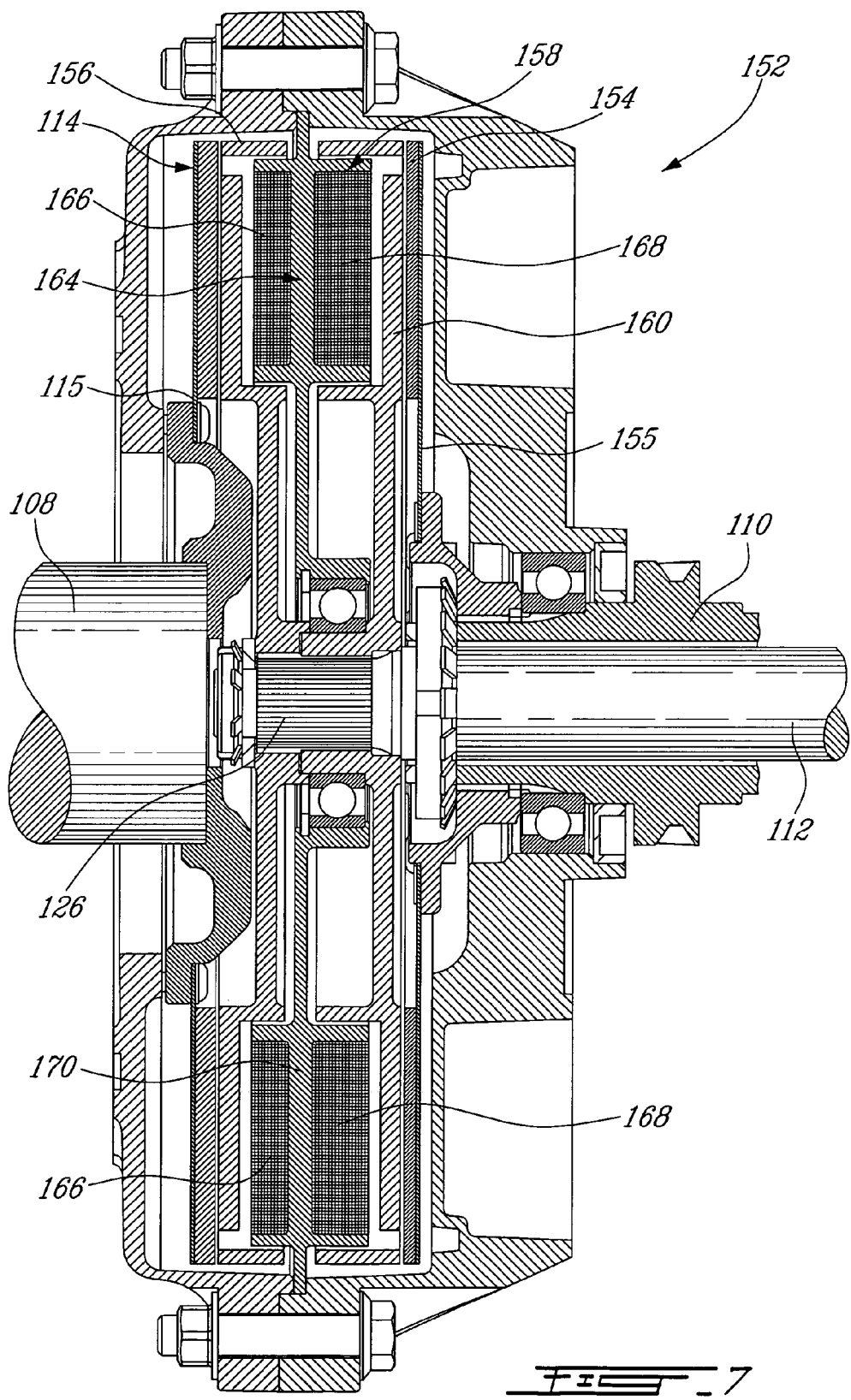
FIG. 7 is a cross-section of a multi-position clutch for selectively coupling two of three rotatable shafts according to a seventh illustrative embodiment of the present invention.

A multi-position clutch 152 for selectively coupling at least two of three rotatable shafts 108-112 according to a seventh illustrative embodiment of the present invention will now be described with reference to FIG. 7. Since the clutch 152 is very similar to the clutch 106 and for concision purposes only the important differences between the two clutches 106 and 152 will be described hereinbelow in more detail.

Generally stated, the main difference between the two clutches 106 and 152 is that while the electromagnetic coils 138 and 140 of the clutch 106 are radially spaced, the electromagnetic coils 166 and 168 of the clutch 152 are provided back to back on the actuating element 158.

While the first contact disk 156 is very similar to the first contact disk 130 described with reference to FIG. 6, the second peripheral contacting ring 154 is more radially distanced compared to the second peripheral contact ring 124 of FIG. 6. Indeed, the second contact disk 160 is adapted to the modified configuration of the actuating element 158 compared to the one described with reference to FIG. 6. More specifically, the second contact disk 160 is generally a mirror image of the first contact disk 130.

The actuating element 158 is in the form of a disk mounted about the spline portion 126 via the second contact disk 160 in the present case. The actuating element 158 includes a peripheral enlarged ring portion 164 including the first and second electromagnetic coils 166-168, which are separated by a layer of metal 170.

Both the cooperation element 114 and 154 include respective thinner and relatively flexible portions 115 and 155 allowing movements of these elements under the magnetic influence of the electromagnetic coils 166 and 168.

The operation of the clutch 152 will not be described since it is very similar to the operation of the clutch 106.

Of course, other configurations of the actuating element and of the first and second contact disks are of course possible without departing from the spirit and nature of the present invention.

Even though a multi-position clutch according to the present invention has been described with reference to a hybrid drive train, it is not limited to such an application. For example, it can also be used to select the drive in a hybrid wind turbine including and ICE as an alternative driving force. Any other application is also possible where at least two rotatable shafts among at least three rotatable shafts are to be selectively coupled.

Although the present invention has been described hereinabove by way of preferred embodiments thereof, it can be modified, without departing from the spirit and nature of the subject invention as defined in the appended claims.

What is claimed is:

1. A multi-position clutch for selectively coupling at least two of at least three rotatable power transmitting shafts, the three rotatable power transmitting shafts being respectively coupled to power input/output devices, the clutch comprising:

at least three cooperation elements each respectively associated to one of the at least three rotatable power transmitting shafts for selective engagement therebetween; each of said at least three cooperation elements being mounted to one of said at least three rotatable power transmitting shafts so as to be sequentially positioned for selective coupling of at least two adjacent cooperation elements, where:

first and second cooperation elements of the at least three cooperation elements respectively include contact rings secured to respective first and second of the at least three rotatable power transmitting shafts; and a third cooperation element of the at least three cooperation elements is positioned between the first and second cooperation elements for reciprocal movement from a freewheeling position to a first or second engagement position with the respective first or second cooperation element; the third cooperation element including first and second contact disks mounted to a third of the at least three rotatable power transmitting shafts;

where one of the at least three rotatable power transmitting shaft is concentrically and rotatably mounted in one of the other rotatable power transmitting shaft; and an actuating mechanism associated to the third of the at least three cooperation elements for selectively coupling the first and second contact disks of the third cooperation element to the contact rings of the first and second cooperation elements;

whereby selective coupling of at least two adjacent cooperation elements from said at least three cooperation elements couple respective power transmitting shafts which couple respective power input/output devices.

2. A multi-position clutch as recited in claim 1, wherein two of the at least three rotatable power transmitting shafts are collinear; the others of the at least three rotatable power transmitting shafts being hollow and coaxially mounted about one of the at least three rotatable power transmitting shafts; wherein, consecutive concentric shafts correspond to associated consecutive adjacent cooperation elements.

3. A multi-position clutch as recited in claim 1, wherein said at least three cooperation elements are comprised in an enclosure.

4. A multi-position clutch as recited in claim 3, wherein said enclosure is a two-part shell.

5. A multi-position clutch as recited in claim 3, wherein said enclosure includes first and second openings for receiving said at least three rotatable power transmitting shafts.

6. A multi-position clutch as recited in claim 1, wherein said at least three cooperation elements include first, second and third cooperation elements; said first and second cooperation elements being in the form of toothed gears having teeth on opposite facing sides; said third cooperation element being positioned adjacent and between both said first and second cooperation elements; said third cooperation element being in the form of a toothed gear having teeth on both sides for selective complementary cooperation with said first and second cooperation elements.

7. A multi-position clutch as recited in claim 1, wherein said at least two adjacent cooperation elements include cooperating toothed gears.

8. A multi-position clutch as recited in claim 7, wherein said toothed gears includes at least one of rectangular teeth and tapered teeth.

9. A multi-position clutch as recited in claim 1, wherein said at least two adjacent cooperation elements include friction disks.

10. A multi-position clutch as recited in claim 1, wherein the at least three rotatable power transmitting shafts include first and second shafts and a shaft assembly; the first and second shafts being aligned and coaxial; the second shaft being hollow; the shaft assembly comprising a third hollow shaft mounted in the second hollow shaft for reciprocal movement therein and a fourth shaft mounted in the third hollow shaft for reciprocal movement therein; said at least three cooperation elements including first, second, third and fourth cooperation elements respectively secured to said first, second, third and fourth rotatable power shafts; said third and fourth cooperation elements yielding a double-headed cooperation element when said third and fourth cooperation elements are joined together;

said actuating mechanism being associated to said double-headed cooperation element;

whereby, in operation, the multi-position clutch is movable by said actuating mechanism from a free-wheeling position, where said double-headed cooperation element does not engage one of said first and second cooperation element, to one of a first, second and third engagement positions; in said first engagement position, said first cooperation element being engaged by said double-headed cooperation element; in said second engagement position, said second cooperation element being engaged by said double-headed cooperation element; and in said third engagement position, said double-headed cooperation element being split so that said first cooperation element is engaged by said fourth cooperation element and said second cooperation element is engaged by said third cooperation element, resulting in the coupling of said first, second, third and fourth shafts.

11. A multi-position clutch as recited in claim 1, wherein first and second cooperation elements of said at least three cooperation elements include respective first and second friction plates; a third one of said at least three cooperation elements being positioned between said first and second cooperation elements and being generally in the form of a disk including a friction element movable between first and second engagement positions with respective first and second friction plates; said actuating mechanism including first and second electromagnetic coils located adjacent respective said first and second friction elements opposite said third cooperation element;

whereby, in operation, i) energizing said first electromagnetic coil causes said third cooperation element to move from a freewheeling position to a first engagement position with said first cooperation element, resulting in the coupling of the shafts associated to said first and third cooperation elements; and ii) energizing said second electromagnetic coil causes said third cooperation element to move from said freewheeling position to a second engagement position with said second cooperation element, resulting in the coupling of the shafts associated to said second and third cooperation elements.

12. A multi-position clutch as recited in claim 11, wherein said third cooperation element includes i) an inner disk for receiving one of said at least three rotatable power transmitting shafts and ii) said friction element in the form of a peripheral ring movably mounted to said inner disk.

13. A multi-position clutch as recited in claim 12, wherein said peripheral ring is movably mounted to said inner disk via spring clamps.

14. A multi-position clutch as recited in claim 11, wherein said first, second and third cooperation elements are comprised in an enclosure; said first and second electromagnetic coils being mounted in said enclosure.

15. A multi-position clutch as recited in claim 1, wherein said multi-position clutch is a three-position clutch for selectively coupling two of three rotatable power transmitting shafts.

16. A multi-position clutch as recited in claim 1, wherein said multi-position clutch is a four-position clutch for selectively coupling at least two of four rotatable shafts.

17. A multi-position clutch for selectively coupling at least two of at least three coaxial rotatable power transmitting shafts, the three coaxial rotatable power transmitting shafts each being respectively coupled to one of at least three coaxial power input/output devices, one of the at least three coaxial rotatable power transmitting shafts being hollow to receive another of the at least three coaxial rotatable power transmitting shafts, the multi-position clutch comprising:

at least three cooperation elements each respectively associated to one of the at least three coaxial rotatable power transmitting shafts for selective engagement therebetween; each of said at least three cooperation elements being mounted to one of said at least three coaxial rotatable power transmitting shafts so as to be sequentially positioned for selective coupling of at least two adjacent cooperation elements; and an actuating mechanism associated to at least one of said at least three cooperation elements for selectively coupling said at least two adjacent cooperation elements from said at least three cooperation elements;

whereby selective coupling of at least two adjacent cooperation elements of said at least three cooperation elements couples at least two respective coaxial power transmitting shafts, thereby coupling at least two respective coaxial power input/output devices.

18. A multi-position clutch as recited in claim 17, wherein said at least three cooperation elements are comprised in an enclosure.

19. A multi-position clutch as recited in claim 18, wherein said enclosure is a two-part shell.

20. A multi-position clutch as recited in claim 18, wherein said enclosure includes first and second openings for receiving said at least three coaxial rotatable power transmitting shafts.

21. A multi-position clutch as recited in claim 18, wherein said at least three cooperation elements include first, second and third cooperation elements; said first and second cooperation elements being in the form of toothed gears having teeth on opposite facing sides; said third cooperation element being positioned adjacent and between both said first and second cooperation elements; said third cooperation element being in the form of a toothed gear having teeth on both sides for selective complementary cooperation with said first and second cooperation elements.

22. A multi-position clutch as recited in claim 17, wherein said at least two adjacent cooperation elements include cooperating toothed gears.

23. A multi-position clutch as recited in claim 22, wherein said toothed gears includes at least one of rectangular teeth and tapered teeth.

24. A multi-position clutch as recited in claim 17, wherein said at least two adjacent cooperation elements include friction disks.

25. A multi-position clutch as recited in claim 17, wherein the at least three coaxial rotatable power transmitting shafts include first and second shafts and a shaft assembly; the first and second shafts being aligned and coaxial; the second shaft being hollow; the shaft assembly comprising a third hollow shaft mounted in the second hollow shaft for reciprocal movement therein and a fourth shaft mounted in the third hollow shaft for reciprocal movement therein; said at least three cooperation elements including first, second, third and fourth cooperation elements respectively secured to said first, second, third and fourth coaxial rotatable power transmitting shafts; said third and fourth cooperation elements yielding a double-headed cooperation element when said third and fourth cooperation elements are joined together; said actuating mechanism being associated to said double-headed cooperation element;

whereby, in operation, the multi-position clutch is movable by said actuating mechanism from a free-wheeling position, where said double-headed cooperation element does not engage one of said first and second cooperation element, to one of a first, second and third engagement positions; in said first engagement position, said first cooperation element being engaged by said double-headed cooperation element; in said second engagement position, said second cooperation element being engaged by said double-headed cooperation element; and in said third engagement position, said double-headed cooperation element being split so that said first cooperation element is engaged by said fourth cooperation element and said second cooperation element is engaged by said third cooperation element, resulting in the coupling of said first, second, third and fourth shafts.

26. A multi-position clutch as recited in claim 17, wherein first and second cooperation elements of said at least three cooperation elements include respective first and second friction plates; a third one of said at least three cooperation elements being positioned between said first and second cooperation elements and being generally in the form of a disk including a friction element movable between first and second engagement positions with respective first and second friction plates; said actuating mechanism including first and second electromagnetic coils located adjacent respective said first and second friction elements opposite said third cooperation element;

whereby, in operation, i) energizing said first electromagnetic coil causes said third cooperation element to move from a freewheeling position to a first engagement position with said first cooperation element, resulting in the coupling of the coaxial rotatable power transmitting shafts associated to said first and third cooperation elements; and ii) energizing said second electromagnetic coil causes said third cooperation element to move from said freewheeling position to a second engagement position with said second cooperation element, resulting in the coupling of the coaxial rotatable power transmitting shafts associated to said second and third cooperation elements.

27. A multi-position clutch as recited in claim 26, wherein said third cooperation element includes i) an inner disk for receiving one of said at least three coaxial rotatable power transmitting shafts and ii) said friction element in the form of a peripheral ring movably mounted to said inner disk.

28. A multi-position clutch as recited in claim 27, wherein said peripheral ring is movably mounted to said inner disk via spring clamps.

29. A multi-position clutch as recited in claim 26, wherein said first, second and third cooperation elements are comprised in an enclosure; said first and second electromagnetic coils being mounted in said enclosure.

30. A multi-position clutch as recited in claim 17, wherein said multi-position clutch is a three-position clutch for selectively coupling two of three coaxial rotatable power transmitting shafts.

31. A multi-position clutch as recited in claim 17, wherein said multi-position clutch is a four-position clutch for selectively coupling at least two of four coaxial rotatable power transmitting shafts.

32. A multi-position clutch as recited in claim 17, wherein said actuating mechanism includes a controller.

* * * * *